US008190783B2

(12) United States Patent
Elmer et al.

(10) Patent No.: US 8,190,783 B2
(45) Date of Patent: May 29, 2012

(54) ASSIGNING INPUT DEVICES TO SPECIFIC SESSIONS

(75) Inventors: Robert C. Elmer, Redmond, WA (US); David J. Sebesta, Redmond, WA (US); Jack Creasey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 12/773,197

(22) Filed: May 4, 2010

(65) Prior Publication Data

US 2011/0276723 A1    Nov. 10, 2011

(51) Int. Cl.
*G06F 3/00* (2006.01)
*G06F 13/28* (2006.01)
*G06F 13/00* (2006.01)
*G06F 5/00* (2006.01)
*G06F 13/12* (2006.01)
*G06F 13/38* (2006.01)

(52) U.S. Cl. ............. 710/5; 710/1; 710/2; 710/3; 710/4; 710/6; 710/7; 710/8; 710/9; 710/10; 710/21; 710/32; 710/36; 710/44; 710/45; 710/55; 710/56; 710/62; 710/74; 710/100

(58) Field of Classification Search ............... 710/1–100
See application file for complete search history.

(56) References Cited

U.S. PATENT DOCUMENTS

| | | | | |
|---|---|---|---|---|
| 5,818,691 A | * | 10/1998 | McMahan et al. | 361/679.43 |
| 6,222,529 B1 | * | 4/2001 | Ouatu-Lascar et al. | 715/745 |
| 6,708,228 B1 | | 3/2004 | Meyers et al. | |
| 6,963,937 B1 | | 11/2005 | Kamper et al. | |
| 7,043,697 B1 | * | 5/2006 | Jensen et al. | 715/788 |
| 7,542,774 B1 | | 6/2009 | Svoboda et al. | |
| 7,636,805 B2 | * | 12/2009 | Rosenberg | 710/72 |
| 2007/0294632 A1 | | 12/2007 | Toyama et al. | |
| 2008/0082639 A1 | | 4/2008 | Hochmuth et al. | |
| 2009/0085871 A1 | | 4/2009 | Bhogal et al. | |
| 2011/0106982 A1 | * | 5/2011 | Guzikevits et al. | 710/15 |

OTHER PUBLICATIONS

Andrews, et al., "Clicky: User-centric Input for Active Spaces", Retrieved at << http://citeseerx.ist.psu.edu/viewdoc/download-?doi=10.1.1.132.4936&rep=rep1&type=pdf >>, Department of Computer Science Report, Aug. 2004, pp. 17.

Fuhrmann, et al., "Concept and Implementation of a Collaborative Workspace for Augmented Reality", Retrieved at << http://citeseerx.ist.psu.edu/viewdoc/download?doi=10.1.1.147.230&rep=rep1&type=pdf >>, Graphics '99, vol. 18, No. 3, Jan. 1999, pp. 1-11.

Smesser, et al., "Using Raw Input from C# to handle multiple keyboards", Retrieved at << http://www.codeproject.com/KB/system/rawinput.aspx >>, Jan. 12, 2007, pp. 10.

"Control one computer with multiple keyboards and mice", Retrieved at << http://www.online-tech-tips.com/free-software-downloads/control-one-computer-with-multiple-keyboards-and-mice/ >>, Dec. 19, 2008, pp. 4.

* cited by examiner

*Primary Examiner* — Chun-Kuan Lee
*Assistant Examiner* — Getente A Yimer (57) ABSTRACT

Architecture that allows programmatic association of devices to sessions and redirects input to the desired session. When the solution is active, input from the devices is not realized by the standard operating system input stack, thereby allowing even reserved key sequences such as Ctrl-Alt-Del to be intercepted and redirected to a desired session. Moreover, in addition to redirecting input to a specific session, the architecture facilitates the filtering of input from unwanted/unmapped devices, the interception and filtering or redirection of reserved key sequences such as Ctrl-Alt-Del, and the maintenance of input state for each session.

19 Claims, 5 Drawing Sheets

ASSIGNING INPUT DEVICES TO SPECIFIC
SESSIONS

BACKGROUND

When multiple input devices (e.g., two keyboards and two mice) are attached to a computing system, input from those devices is merged and passed to the console session. Thus, for example, pressing "shift" key on one keyboard and "a" on the other results in a capital letter A being registered on the console session.

There are scenarios where this comingling of input from multiple devices is disadvantageous. One example is an environment where several users wish to simultaneously use a single computer while working independently in discrete user sessions or separate applications. In such a scenario, specific input devices must be mapped to a specific user session or application, and input from such devices redirected exclusively to that session or application.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture allows programmatic association of devices to separate sessions or applications (windows) and redirects input to the desired session, application, or window of any type. When the solution is active, input from the devices is not realized by the standard operating system input stack, thereby allowing even reserved key sequences such as Ctrl-Alt-Del to be intercepted and redirected to a desired session. Moreover, in addition to redirecting input to a specific session, the architecture facilitates the filtering of input from unwanted/unmapped devices, the interception and filtering or redirection of reserved key sequences such as Ctrl-Alt-Del, and the maintenance of input state for each session.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture allows the mapping of input devices to specific session, application, or window running on a computing system. These devices include but are not limited to input devices that connect to the processing unit(s) through input/output (I/O) device interface(s), but can be connected by other interfaces such as a parallel port, IEEE 1394 serial port, a game port, a USB port, an IR interface, etc.

Although described throughout the description in the context of a session, it is to be understood that the architecture applies to applications and windows as well. Mapping is by programmatic association of the devices to sessions and the redirection of device input to the corresponding session. When activated, input from the input devices is not realized by the standard operating system (OS) input stack, thereby allowing even reserved key sequences to be intercepted and redirected to a desired session.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
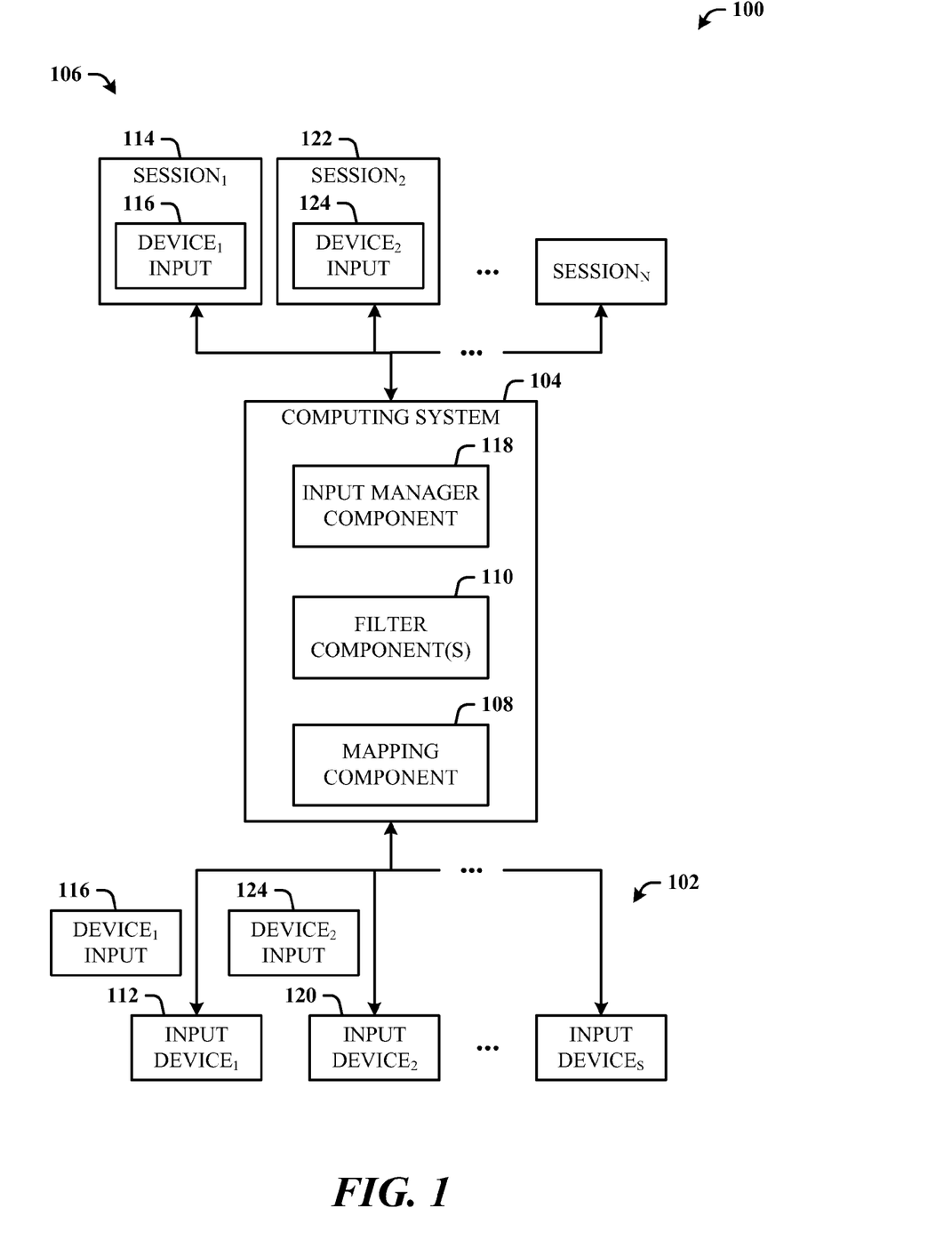
FIG. 1 illustrates a system that redirects input from input devices to specific sessions in accordance with the disclosed architecture.

FIG. 1 illustrates a system 100 that redirects input from input devices to specific sessions in accordance with the disclosed architecture. The system 100 includes multiple input devices 102 connected to a computing system 104 and the computing system 104 is running multiple sessions 106. The system 100 also includes a mapping component 108 that maps input devices 102 to sessions 106. A filter component(s) 110 is associated with each mapped input device that operates in multiple modes. The modes include a redirect mode that redirects device input to a session of which an associated input device is mapped.

For example, a first input device 112 is mapped to a first session 114 via the mapping component 108. Accordingly, device input 116 of the first input device 112 is then redirected from standard (normal) operating system processing through an input manager component 118 to the first session 114. Similarly, a second input device 120 is mapped to a second session 122 via the mapping component 108. Accordingly, device input 124 of the second input device 120 is then redirected from standard operating system processing through the input manager component 118 to the second session 122.

The multiple modes include a normal mode that routes device input to an operating system stack. The multiple modes can also include a discard mode that discards device input entirely. The filter component 110 redirects reserved key sequences (e.g., Ctrl-Alt-Del) of a keyboard input device (e.g., input device 112) to an associated mapped session (e.g., session 114). The filter component 110 creates a device object (e.g., physical device object) for an input device. The device object provides a communications channel via which to control the modes and receive device input.

The input manager component 118 receives raw input data (e.g., device input 116) from the physical device (e.g., input device 112) via the device object and converts the raw input data into compatible operating system messages for insertion into the associated mapped session (e.g., session 114). The input manager component 118 maintains input device state for each mapped session. The input manager component 118 controls input device indicators of the input devices per mapped session. In other words, a light indicator on a keyboard will only be controlled on the keyboard of the associated session, and not a keyboard light on a different keyboard mapped to a different session. The input manager component 118 maintains input device state for each mapped session and manages remote device input from a remote client to a specific session.

Figure 2:
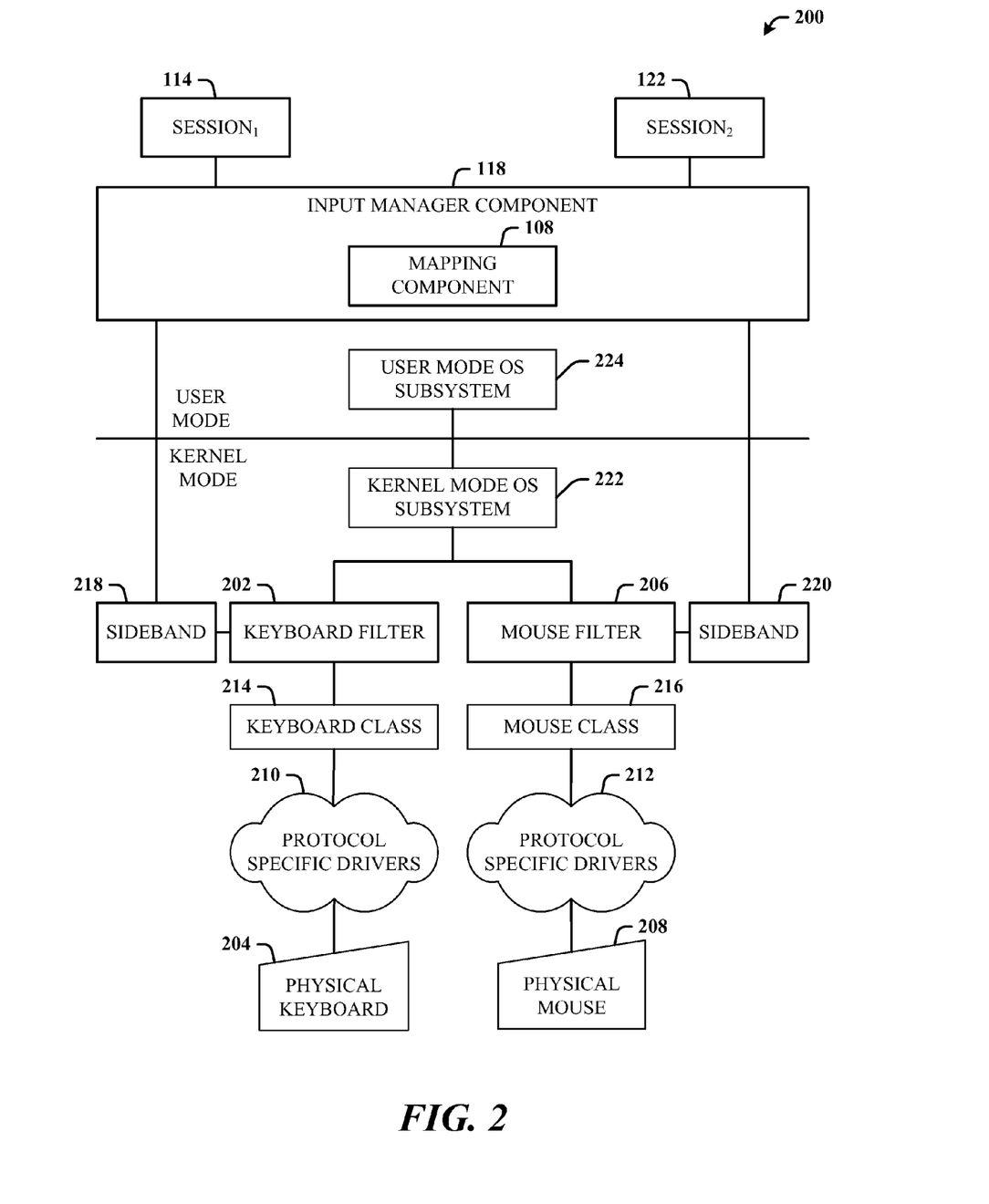
FIG. 2 illustrates a more detailed embodiment of a system that redirects input from input devices to specific sessions.

FIG. 2 illustrates a more detailed embodiment of a system 200 that redirects input from input devices to specific sessions. The disclosed architecture employs filters, sideband communications components for controlling device filters for the physical devices and the input manager component 118. The input manager component 118 is a user-mode component that contains the core logic used to manage the device filters, for example, a keyboard filter 202 (that intercepts keyboard input) for a physical keyboard 204 and a mouse filter 206 (that intercepts mouse input) for a physical mouse 208. The input manager component 118 also includes the mapping component 108 that establishes a mapping between a physical device (e.g., the keyboard 204) and a session (the session 114), maintains input state for the session 114, and injects input from the physical device into the session 114. Similarly, the mapping component 108 establishes a mapping between the physical mouse 208 and the session 122, maintains input state for the session 122, and injects input from the physical device into the session 122.

On the kernel mode side, I/O (input/output) between the physical keyboard 204 is passed to the keyboard filter 202 using protocol specific drivers 210. Similarly, I/O of the physical mouse 208 is passed to the mouse filter 206 using protocol specific drivers 212.

When filter drivers 202 and 206 are in normal mode (not redirecting input, but instead allowing input to be received normally by the OS input stack), the filters (202 and 206) ignore the input and allow the class drivers (214 and 216) to process the input normally. In this case the class drivers (214 and 216) first pass the input to the respective filters (202 and 206) which do not remove the data from the input queues. The class drivers (214 and 216) then pass the input data up to the rest of the OS input stack (222) as if the class filters (202 and 206) were not present at all.

Generally, the class drivers (214 and 216) interact with the filter drivers (202 and 206) to allow the filter drivers (202 and 206) to inspect and modify the input data before the class drivers (214 and 216) pass the input up to the OS input stack 222. When the filter drivers (202 and 206) are operating in redirect mode, the input data passed to the filter drivers (202 and 206) by the class drivers (214 and 216) is removed, and send via the corresponding sideband device (218 and 220) for eventual retrieval by the input manager component 118. In this way, when control returns from the filter drivers (202 and 206) to the class drivers (214 and 216), the class drivers (214 and 216) find that the input buffer being processed is now empty and no input is available to be passed along to OS input stack 222.

The filter drivers (filters 202 and 206) for device input classes (keyboard class 214 and mouse class 216) to be redirected are installed. These drivers create device objects (e.g., physical device objects (PDOs) for the Windows™ OS by Microsoft Corporation) for each device. The input manager component (user mode) locates and opens the device objects. This provides sideband communications channels (keyboard sideband 218 and mouse sideband 220) directly between the input manager component 118 and the drivers (filters 202 and 206), which channels are used to control the respective filter modes, as well as to retrieve any pending input from the physical devices.

The filter drivers (202 and 206) support different operating modes which allow input to be processed by the operating system input stack (kernel mode OS subsystem 222) normally, discarded entirely, and redirected to the input manager component 118 unseen by OS input stack (kernel mode OS subsystem 222). The kernel mode OS subsystem 222 interfaces to a user mode OS subsystem 224 that handles messages from the kernel mode OS subsystem 222.

In redirect mode, the input manager component 118 reads the raw input data from the sideband device objects (sidebands 218 and 220) for any devices being redirected, converts the input data into standard OS input messages (e.g. KEYDOWN, MOUSEMOVE, etc.), and then injects that input messages into the user session mapped to the originating input device.

If no session is mapped to the originating device, the input is forwarded to a registered handler for unmapped input. One of many possible examples uses the unmapped input to establish the initial mapping of the input device (e.g. keyboard) to output device (e.g., monitor) by associating received input with instructions displayed on individual monitors. Note that this is only one embodiment of a USB mapping algorithm; however, other embodiments are possible, USB or otherwise.

In one implementation, a remote connection can be employed to access the user session. In such an implementation, the synthesized input messages are posted to the remote client input window for the mapped session. The remote client then processes the input as if the user had generated that input directly within the remote client window. A remote connection protocol then transports and surfaces the input to the user's session.

For each mapped session, the input manager component 118 maintains input device state. In an implementation using a remote connection, input-related APIs are hooked as the remote connection control is loaded in order to satisfy the input API calls with data relevant to the mapped session. For example, when the remote connection calls a GetKeyState( )API, the input manager component 118 is able to determine the mapped session on whose behalf the remote connection client is making the query and then returns information specific to the key state of that session.

Put another way, a system is provided that comprises multiple input devices connected to a computing system, the computing system running multiple sessions, applications, or windows, a mapping component that maps input devices to sessions, and a filter component associated with each mapped input device that operates in multiple modes. The modes include a redirect mode that redirects device input to a session of which an associated input device is mapped. The filter component creates a device object for an input device. The device object provides a communications channel via which to control the modes and receive device input. The system also includes an input manager component that receives raw input data via the device object and converts the raw input data into compatible operating system messages for insertion into the associated mapped session.

The multiple modes include a normal mode that routes device input to an operating system stack and a discard mode that discards device input. The filter component redirects reserved key sequences of a keyboard input device to an associated mapped session. The input manager component maintains input device state for each mapped session. The input manager component maintains input device state for each mapped session and manages remote device input from a remote client to specific session.

While the architecture has been described to send input from a particular input device to a particular session, this is only one specific embodiment, in that input devices can be assigned to particular window or application. For example, input devices can be assigned to specific instances of an application. That is, if there are three keyboards connected to a system, three separate instances of the application can be launched all within a single user session, where one keyboard is assigned to each of three instances of the application.

Note that although a remote connection is employed to access the user session, the user session need not, in fact, be remote. In one implementation, the session is local (on the same machine to which the input devices are connected). Thus, the session can be local and/or remote.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
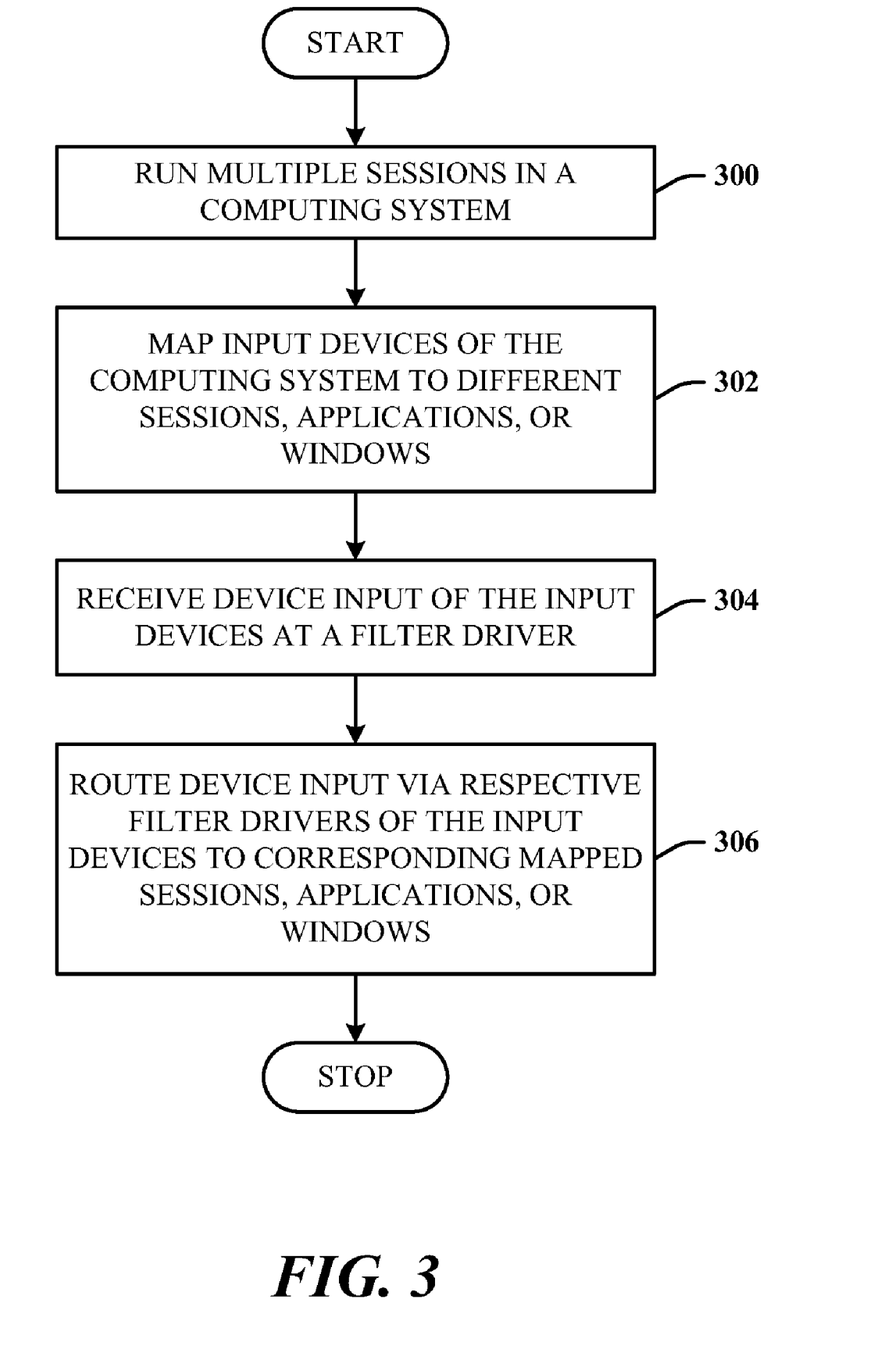
FIG. 3 illustrates a method in accordance with the disclosed architecture.

FIG. 3 illustrates a method in accordance with the disclosed architecture. At 300, multiple sessions are run in a computing system. At 302, input devices of the computing system are mapped to different sessions, applications, or windows. At 304, device input of the input devices is received at a filter driver. At 306, the device input is routed via respective filter drivers of the input devices to corresponding mapped sessions, applications, or windows.

Figure 4:
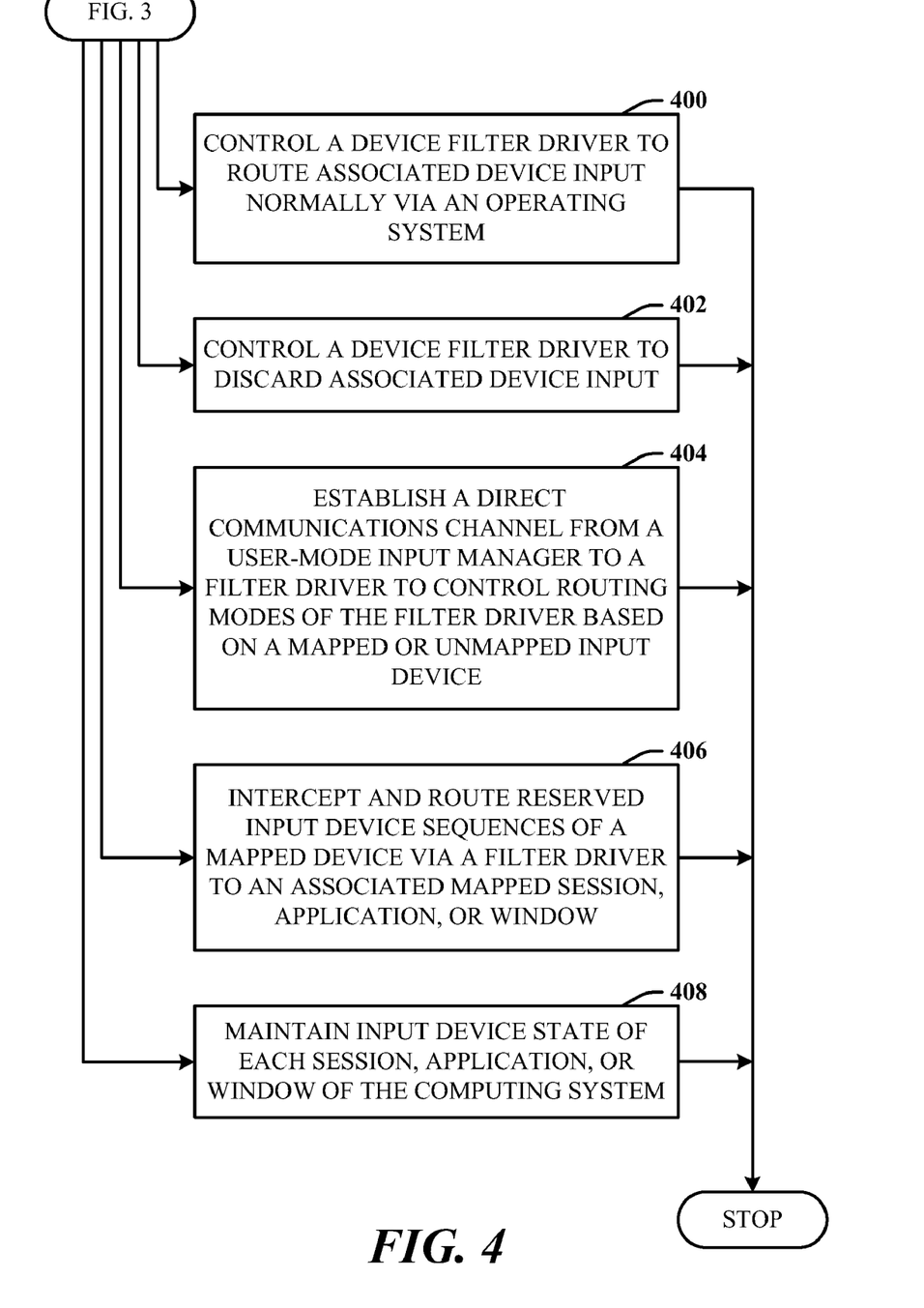
FIG. 4 illustrates further aspects of the method of FIG. 3.

FIG. 4 illustrates further aspects of the method of FIG. 3. At 400, a device filter driver is controlled to route associated device input normally via an operating system. At 402, a device filter driver is controlled to discard associated device input. At 404, a direct communications channel is established from a user-mode input manager to a filter driver to control routing modes of the filter driver based on a mapped or unmapped input device. At 406, reserved input device sequences of a mapped device are intercepted and routed via a filter driver to an associated mapped session, application, or window. At 408, input device state of each session, application, or window of the computing system is maintained.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
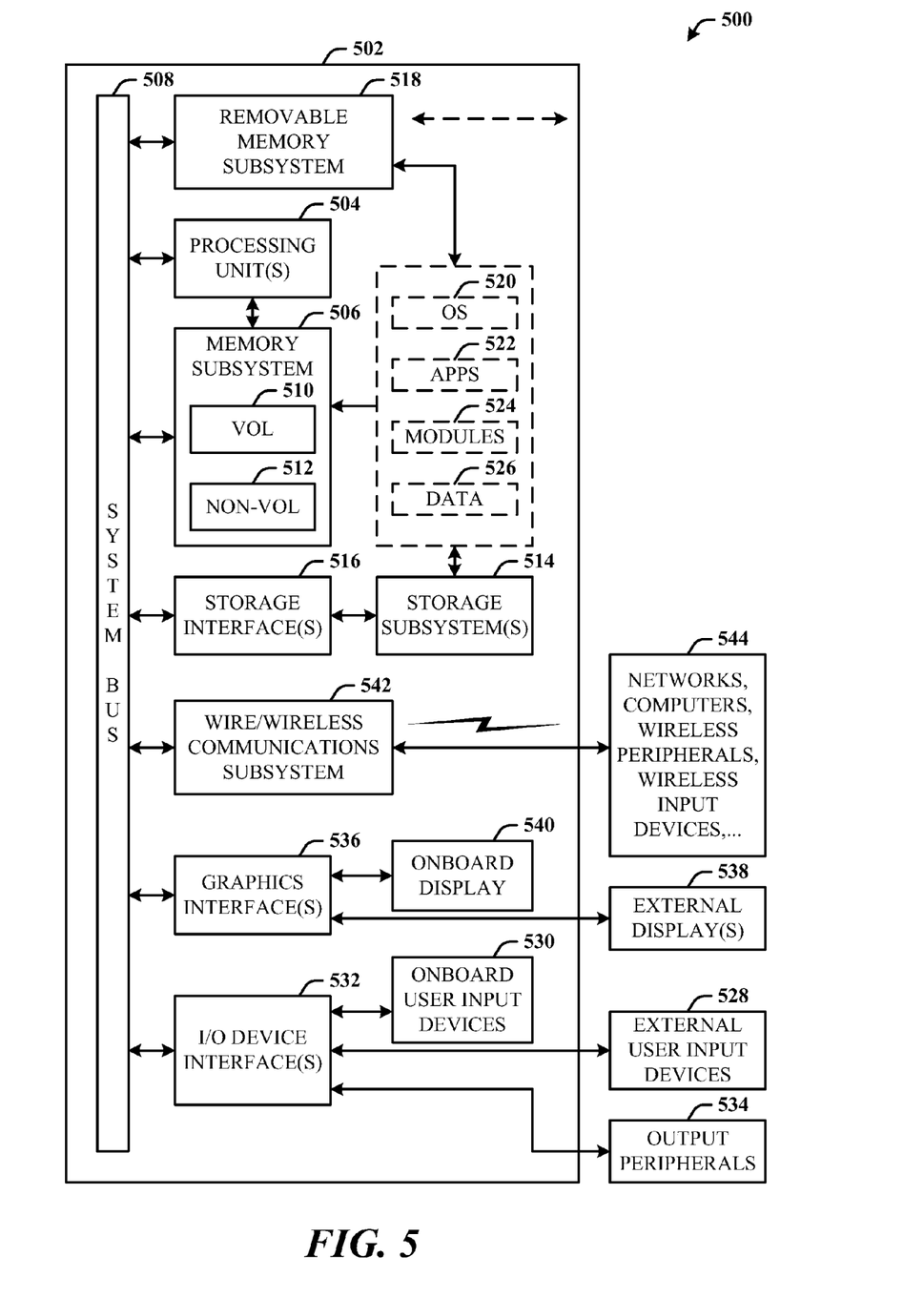
FIG. 5 illustrates a block diagram of a computing system that redirects input from input devices to specific sessions in accordance with the disclosed architecture.

Referring now to FIG. 5, there is illustrated a block diagram of a computing system 500 that redirects input from input devices to specific sessions in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities and components of the system 100 of FIG. 1, the entities and components of the system 200 of FIG. 2, and the methods represented by the flowcharts of FIGS. 3 and 4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a computing system; and
multiple input devices connected to the computing system, the computing system running multiple sessions including a first session and a second session that is different than the first session, the multiple input devices including a first input device and a second input device that is different than the first input device,
wherein the computing system comprises:
a mapping component configured to map the first input device to the first session and the second input device to the second session;

a filter driver that is associated with the first input device and that operates in multiple modes, wherein the multiple modes of the filter driver associated with the first input device include:
- a redirect mode configured to redirect device input from the first input device to the first session by modifying input data received from the first input device before control returns from the filter driver to a class driver for the first input device, the input data being modified such that the input data is not passed to an operating system input stack while the input data is being redirected to the first session; and at least one processing unit configured to execute one or more of the mapping component or the filter driver.

2. The system of claim 1, wherein the multiple modes of the filter driver include a normal mode configured to route the device input to the operating system stack instead of redirecting the device input.

3. The system of claim 1, wherein the multiple modes of the filter driver include a discard mode configured to discard the device input instead of redirecting the device input.

4. The system of claim 1, wherein the first input device comprises a keyboard and the filter driver is further configured to redirect reserved key sequences of the keyboard to the first session.

5. The system of claim 1, wherein the filter driver is further configured to create a device object for the first input device, wherein the device object provides a communications channel to control the multiple modes and receive the device input.

6. The system of claim 5, further comprising an input manager component configured to receive raw input data via the device object and to convert the raw input data into compatible operating system messages for insertion into the first session.

7. The system of claim 6, wherein the input manager component is further configured to maintain input device state for the first session and the second session.

8. The system of claim 6, wherein the input manager component is further configured to control input device indicators of the first input device and the second input device.

9. The system of claim 1, further comprising an input manager component that is configured to maintain input device state for the first session and the second session and to manage remote device input from a remote client to the first session or the second session.

10. The system according to claim 1, wherein modifying the input data comprises modifying an input buffer that is processed by the class driver for the first input device.

11. The system according to claim 10, wherein modifying the input buffer comprises emptying the input buffer so that no input data is in the input buffer when the input buffer is processed by the class driver for the first input device.

12. A physical computer readable storage media that stores executable instructions for execution by a processor, the executable instructions comprising:
- a mapping component configured to map, on a computing system connected to multiple input devices and running multiple sessions, a first input device to a first one of the multiple sessions and a second input device to a second one of the multiple sessions, the first session being different than the second session and the first input device being different than the second input device; and
- a filter driver that is associated with the first input device and that operates in multiple modes, wherein the multiple modes of the filter driver associated with the first input device include:
  - a redirect mode configured to redirect device input from the first input device to the first session by modifying input data received from the first input device before control returns from the filter driver to a class driver for the first input device, the input data being modified such that the input data is not passed to an operating system input stack while the input data is being redirected to the first session.

13. The physical computer readable storage media of claim 12, wherein the multiple modes include a normal mode that routes the device input to the operating system stack and a discard mode that discards the device input.

14. The physical computer readable storage media of claim 12, wherein the first input device comprises a keyboard and the filter component redirects reserved key sequences of the keyboard to the first session.

15. The physical computer readable storage media of claim 12, the executable instructions further comprising an input manager component configured to maintain input device state for the first session and the second session.

16. The physical computer readable storage media of claim 15, wherein the input manager component is further configured to manage remote device input from a remote client.

17. A method comprising:
- mapping, on a computing system connected to multiple input devices and running multiple sessions, a first input device to a first one of the multiple sessions and a second input device to a second one of the multiple sessions, the first session being different than the second session and the first input device being different than the second input device; and
- redirecting, via a filter driver that is associated with the first input device and that operates in multiple modes including a redirect mode, device input from the first input device to the first session by modifying input data received from the first input device before control returns from the filter driver to a class driver for the first input device, the input data being modified such that the input data is not passed to an operating system input stack while the input data is being redirected to the first session, wherein at least one of the mapping or the redirecting is performed by at least one processing unit.

18. The method of claim 17, further comprising establishing a direct communications channel from a user-mode input manager to the filter driver for the first input device to control the multiple modes of the filter driver.

19. The method according to claim 17, wherein modifying the device input of the first input device comprises modifying an input buffer that is processed by the class driver for the first input device.

* * * * *